United States Patent [19]

Bubnash

[11] Patent Number: 5,085,106
[45] Date of Patent: Feb. 4, 1992

[54] ELECTRIC SHIFT APPARATUS WITH REMOVABLE CONTROL MODULE

[75] Inventor: Terry L. Bubnash, Birmingham, Mich.

[73] Assignee: Automotive Products (USA) Inc., Auburn Hills, Mich.

[21] Appl. No.: 607,142

[22] Filed: Oct. 30, 1990

[51] Int. Cl.⁵ .................................. B60K 41/06
[52] U.S. Cl. ........................... 74/866; 74/335
[58] Field of Search ............ 74/335, 861, 866, 843; 364/424.1

[56] References Cited

U.S. PATENT DOCUMENTS

| | | | |
|---|---|---|---|
| 4,240,516 | 12/1980 | Henderson | 180/289 |
| 4,275,618 | 6/1981 | Bale | 74/878 |
| 4,327,353 | 4/1982 | Beard et al. | 340/64 |
| 4,438,752 | 3/1984 | Cheung | 123/630 |
| 4,477,874 | 10/1984 | Ikuta | 364/424 |
| 4,790,204 | 12/1988 | Tury et al. | 74/483 |
| 4,817,471 | 4/1989 | Tury | 74/866 |
| 4,841,793 | 6/1989 | Monstevens et al. | 74/335 |
| 4,843,901 | 7/1989 | Peterson et al. | 74/335 |
| 4,922,769 | 5/1990 | Tury | 74/866 |
| 4,981,202 | 1/1991 | Monstevens et al. | 74/335 X |

FOREIGN PATENT DOCUMENTS 60-40850  3/1985  Japan .

OTHER PUBLICATIONS

SAE Technical Paper #850782, "Digital Electronic Controls For Detroit Diesel Allison Off-Highway Transmissions".
SAE Technical Paper Series #861170, "Digital Electronic Controls For Detroit Diesel Allison Heavy Hauling Transmissions".

*Primary Examiner*—Dwight Diehl
*Attorney, Agent, or Firm*—Krass & Young

[57] ABSTRACT

An electric shift apparatus for a motor vehicle transmission in which the control means for the transmission includes a key card which must be inserted into a receptacle submodule of the control means to enable operation of the transmission and/or to enable starting of the vehicle engine. The key card includes a plurality of push button membrane switches corresponding to the various shift positions of the transmission as well as a magnetic strip containing the unique identifying code of the vehicle. Insertion of the key card into the receptacle submodule allows the magnetic code to be identified as the proper code for that particular vehicle, whereby to allow starting of the vehicle engine, and further enables the transmission of the vehicle so that selective depression of the various push button switches provided on the key card shifts the transmission to respective positions corresponding to the selected switches.

16 Claims, 4 Drawing Sheets

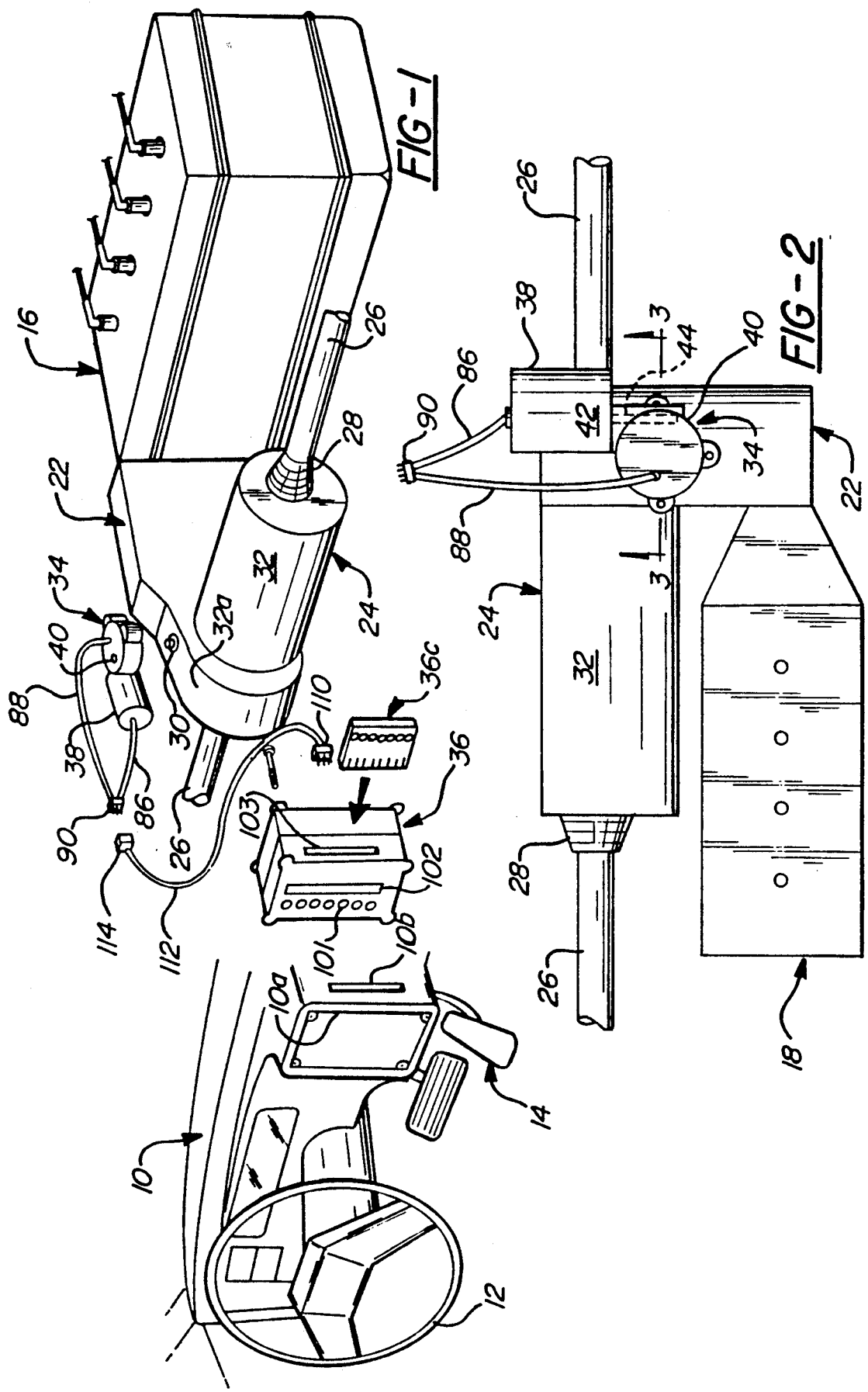

ELECTRIC SHIFT APPARATUS WITH REMOVABLE CONTROL MODULE

BACKGROUND OF THE INVENTION

This invention relates to an electric shift apparatus especially suited with a motor vehicle having an automatic transmission.

Motor vehicles since their inception have required some manner of gear change mechanism to satisfy the varying torque and speed requirements encountered during the typical duty cycle of a motor vehicle. For many years these gear change mechanisms were manual in the sense that they required an operator input from the shift lever or the like to effect each desired gear change ratio. More recently, so-called "automatic transmissions" have become popular in which much of the shifting is done without operator input in response to a sensed speed and throttle opening parameters. These automatic transmissions typically include a mode select member on the transmission housing movable between a plurality of selected positions corresponding to a respective plurality of shift modes within the transmission. The mode select member is moved between its several shift positions by a cable or linkage mechanism extending from the mode select member to a suitable gear selector lever located in the passenger compartment of the vehicle. Various proposals have been made in the past to eliminate the mechanical interconnection between the driver operated lever and the mode select member and provide instead an electrical signal generated by a suitable action on the part of the driver and transmitted electrically to some manner of power means arranged to move the mode select member. Electric shift arrangements of this type are shown, for example, in U.S. Pat. Nos. 4,790,204, 4,841,793, 4,817,471, 4,843,901 and 4,922,769, all assigned to the assignee of the present invention. This invention comprises an improvement of the electric shift apparatus of the type disclosed in the above-identified patents and, specifically, relates to an electric shift apparatus in which a removable module is provided to control the operation of the transmission and/or to enable the starter system of the vehicle engine.

SUMMARY OF THE INVENTION

This invention relates to a control system for an automatic transmission of a motor vehicle. According to an important feature of the invention, the control system includes receptacle means positioned within the vehicle passenger compartment and an enabling module which is operative to enable the transmission control means when received in the receptacle means and is operative to disenable the transmission control means when removed from the receptacle means. This arrangement allows the operator to remove the enabling module when leaving the vehicle so as to preclude unauthorized operation of the transmission.

According to a further feature of the invention, the enabling module includes mode select indicia corresponding respectively to the various transmission shift positions and, with the enabling module received in the receptacle means, the control means is operative in response to operator selection of a particular mode select indicia to shift the transmission to the transmission position corresponding to the selected indicia. This arrangement positively precludes movement of the transmission between its various shift positions until the enabling module has been positioned within the receptacle.

According to a further feature of the invention, the enabling module further includes code indicia corresponding to a unique identifying code for the vehicle and the control system further includes means for recognizing the code indicia and operative in response to such recognition to enable starting of the vehicle engine. This arrangement allows the same enabling module to allow shifting operation of the transmission and to allow starting of the vehicle engine.

According to a further feature of the invention, the enabling module comprises a key card and the mode select indicia and code indicia comprise information provided on the card. This arrangement allows the key card, conveniently of credit card size, to be ordinarily carried on the person of the operator and readily retrieved for purposes of operating the transmission and/or enabling the starter system of the vehicle.

In the disclosed embodiment of the invention, the automatic transmission is of the type including a mode select member for selectively shifting the transmission between a plurality of shift positions; the electric shift apparatus includes a power module adapted to be connected to the mode select member of the transmission and a control module, including a plurality of mode select indicia accessible to the vehicle operator and corresponding respectively to the transmission shift positions, operative in response to operator selection of a particular indicia to energize the power module in a sense to move the mode select member to a position corresponding to the operator selection; and the control module includes an enabling key card which embodies the mode select indicia and which may be inserted and removed from a receptacle within the vehicle passenger compartment to enable and disenable the electric shift apparatus.

BRIEF DESCRIPTION OF THE DRAWINGS

FIG. 1 is a fragmentary perspective view of a front wheel drive motor vehicle embodying the invention electric shift apparatus;

FIG. 2 is a fragmentary plan view of the front wheel drive assembly of the vehicle of FIG. 1;

DETAILED DESCRIPTION OF THE PREFERRED EMBODIMENT

Figure 3:
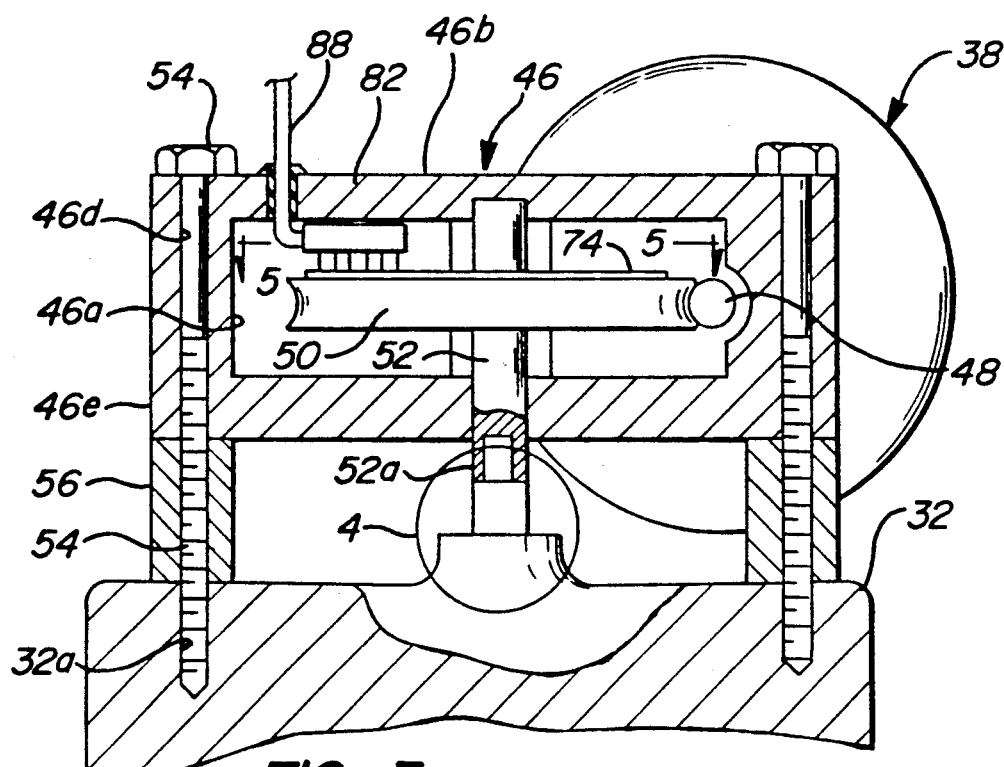
FIG. 3 is a view taken on line 3—3 of FIG. 2.
Figure 4:
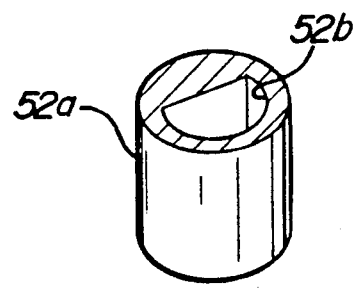
FIG. 4 is a fragmentary exploded perspective view of the structure within the circle 4 of FIG. 3.
Figure 5:
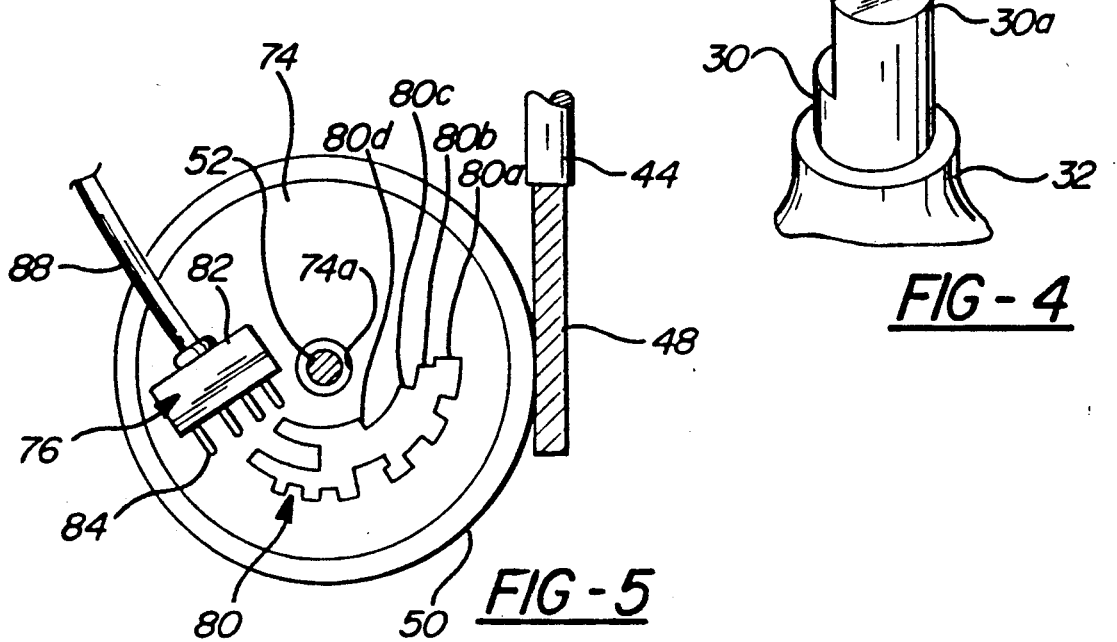
FIG. 5 is a view taken on line 5—5 of FIG. 3.
Figure 6:
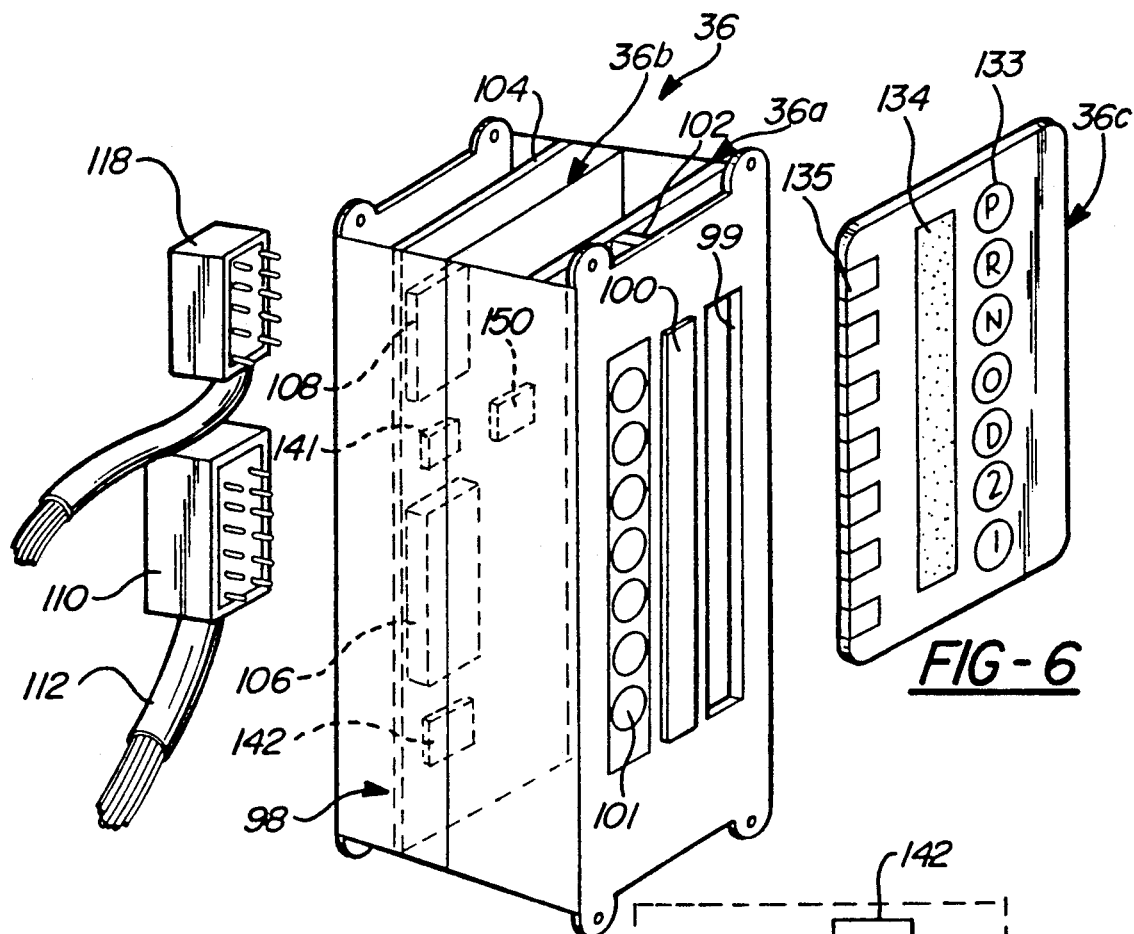
FIG. 6 is a fragmentary perspective view of a control module employed in the invention electric shift apparatus.
Figure 7:
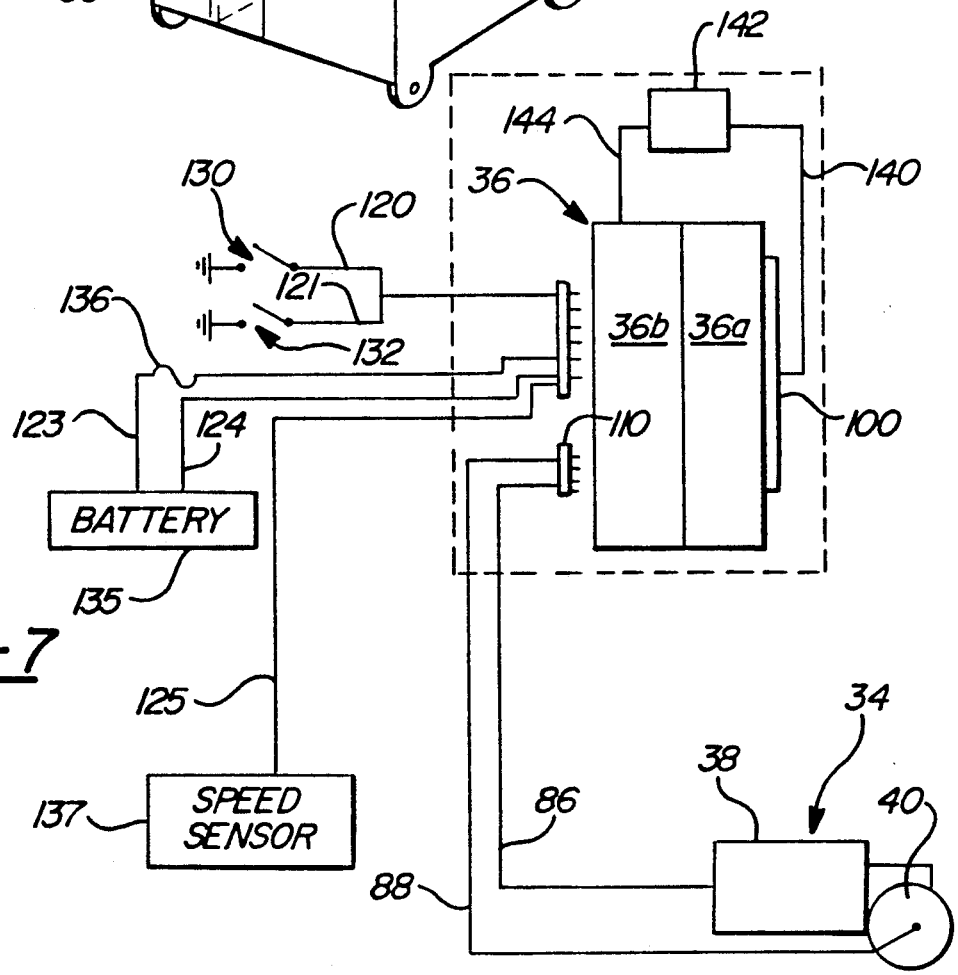
FIG. 7 is a circuit diagram for the invention electric shift apparatus.
Figure 8:
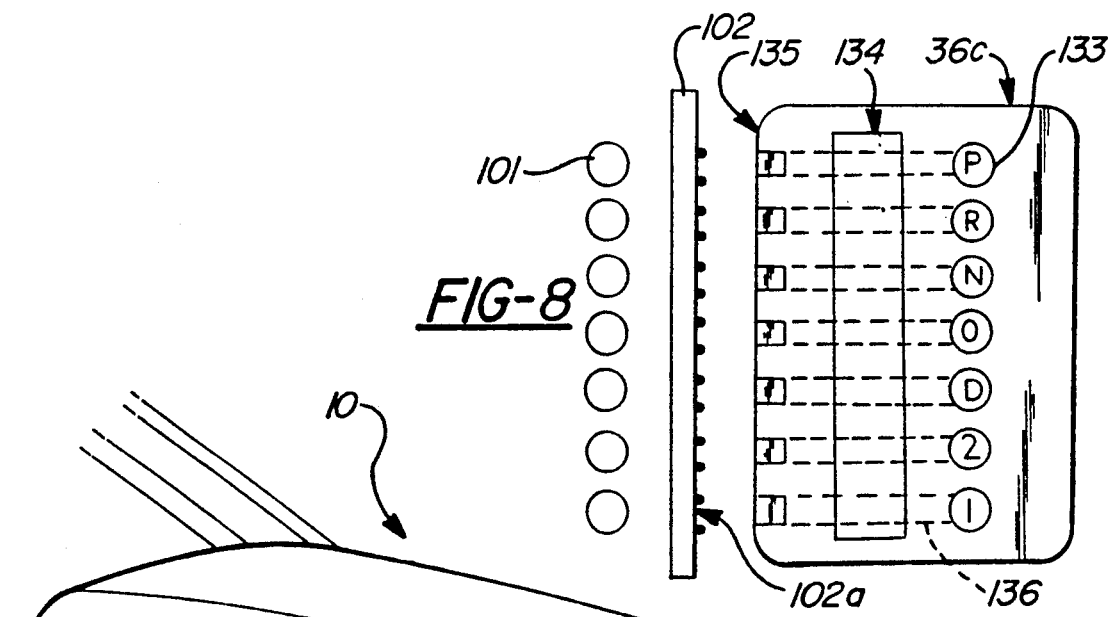
FIG. 8 is a view of a key card employed in the invention electric shift apparatus.
Figure 9:
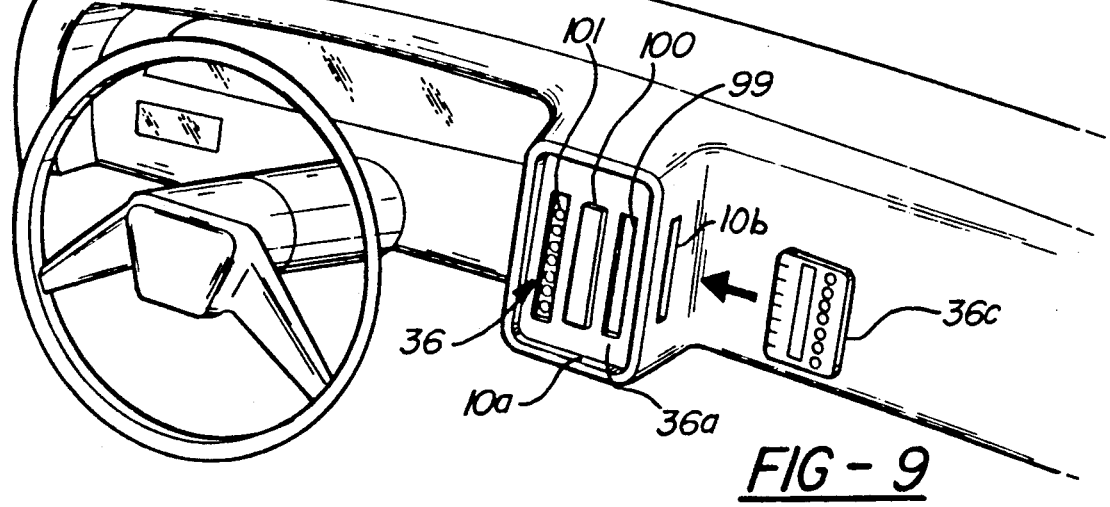
FIG. 9 is a fragmentary perspective view showing the installed disposition of the control module in the instrument panel of the vehicle.
Figure 10:
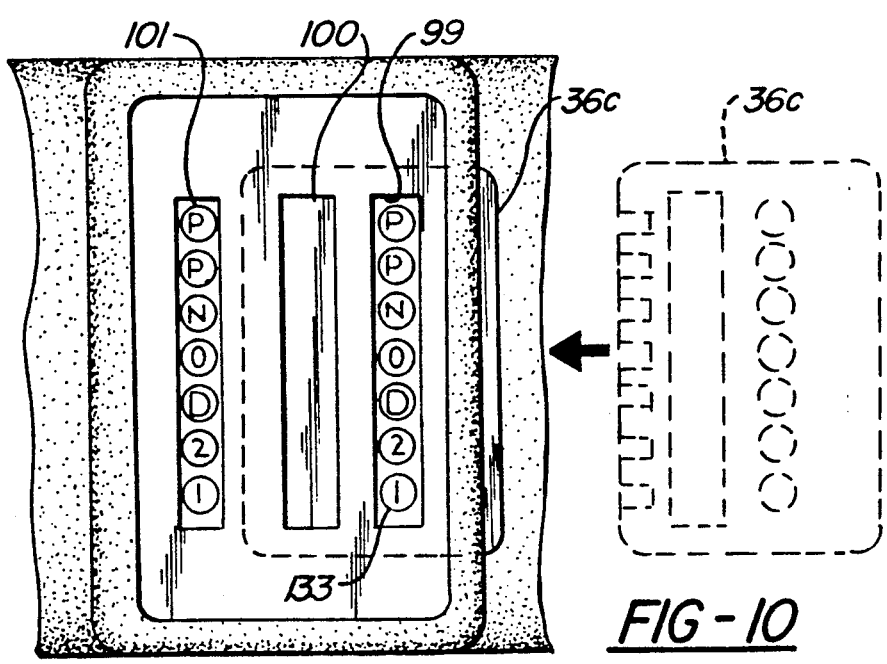
FIG. 10 is a fragmentary somewhat diagrammatic view showing the structure and operation of the key card.

The invention electric shift apparatus is seen schematically in FIG. 1 in association with a motor vehicle of the front wheel drive type and including an instrument panel assembly 10 positioned within the passenger compartment of the motor vehicle, a steering wheel 12 associated with the instrument panel, an accelerator pedal assembly 14 and a front wheel drive assembly 16.

Front wheel drive assembly 6 includes an internal combustion engine 18 mounted transversely in the engine compartment of the vehicle, a torque converter 20 driven by engine 18, a gear drive assembly 22, an automatic transmission 24, and drive shafts 26 drivingly connected to the opposite ends of transmission 24 by U-joints 28. Transmission 24 includes a mode select shaft 30 having a free upper end position above the housing 32 of the transmission 24 and operable in known manner in response to rotation of the shaft to operate internal devices within the transmission to position the transmission in a plurality of transmission modes such as park, neutral, drive, etc.

The invention electric shift apparatus, broadly considered, comprises a power module 34 and a control module 36.

Power module 34 is adapted to be bolted to transmission housing 32 in proximity to mode select shaft 30 and control module 36 is adapted to be positioned in the instrument panel 10 of the vehicle for convenient operator access.

Power module 34 is in the form a motor assembly and includes a DC electric motor 38 and a speed reduction unit 40.

Motor 38 is a direct current motor having, for example, an output torque rating of 200 inch pounds and includes a housing 42 and an output shaft 44.

Speed reduction unit 40 includes a housing 46 fixedly secured to motor housing 42 and defining an internal cavity 46a, a worm gear 48 formed as a coaxial extension of motor output shaft 44 and extending into cavity 46a, a worm wheel 50 positioned in cavity 46a and driven by worm wheel 48, and an output shaft 52 driven by worm wheel 50 journalled in housing walls 46b and 46c and including a free lower end 42a positioned outside of and below housing wall 46c. Shaft lower end 52a includes a D-shaped opening 52b for driving coupling receipt of the D-shaped upper end portion 30a of mode select shaft 30.

Motor assembly 34 is mounted on the upper face of transmission housing 32 by a plurality of bolts 54 passing downwardly through bores 46d in lug portions 46e of reduction unit housing 46 and downwardly through spacers 56 in tapped bores 32a in transmission housing 32. In assembled relation reduction unit output shaft 52 is coaxially aligned with mode select shaft 30 and D opening 52b in reduction shaft lower end 52a telescopically receive D-shaped upper end 30a of mode select shaft 30 so that actuation of motor 38 acts through worm shaft 48, worm wheel 50 and reduction unit output shaft 52 to drive mode select shaft 30.

Power module 34 further includes an encoder assembly 72 operative to sense the instantaneous shift position of the transmission and generate an encoded signal representative of the sent shift position.

Encoder assembly 72 includes an encoder wheel 74 and a pickup device 76. Encoder wheel 74 may be formed, for example, of a suitable plastic material and is secured to a side face of worm wheel 50 within reduction unit housing chamber 46a. Encoder wheel 74 includes a central aperture 74a passing speed reduction unit output shaft 52 and further includes code indicia 80 provided on the exposed outer face of the wheel and arranged along four arcuate tracks 80a, 80b, 80c and 80d centered on the center line of the encoder wheel.

Pickup device 70 includes a plastic body member 82 mounting a plurality of flexible resilient contact fingers 84 for respective coaction with indicia tracks 80a, 80b, 80c and 80d. In addition to the four fingers 84 for respective engagement with the four indicia tracks, a fifth finger is provided to provide a ground for the system.

A lead 86 from motor 42 and a lead 88 from pickup device 76 are combined into a pin-type plug 90.

Control module 36 is intended for ready installation in an opening 10a in instrument panel 10 by insertion of the module from the rear of the panel and fastening of the module within opening 10a by the use of several fasteners such as seen at 96. Module 36 includes a receptacle submodule 36a, a logic submodule 36b, and an enabling submodule 36c.

Receptacle submodule 36a and logic submodule 36b preferably share a common housing structure 98 of generally box-like configuration to facilitate their mounting in the instrument panel opening 10a, and enabling submodule 36c is in the form of a key card adapted for removable insertion with respect to receptacle submodule 36b.

Receptacle submodule 30a includes a window 99 defined in the front face of the submodule; a card reader 100 positioned on the front face of the submodule; a plurality of indicator lights 101 positioned in serial, stacked relation on the front face of the submodule and corresponding respectively to the various shift positions of the transmission 24; a printed circuit board 102; and a slot 103 in a side wall of the housing of the submodule sized to receive key card 36c.

Logic submodule 36b includes printed circuit board 104 suitably electrically connected to printed circuit board 102 and suitably mounting a first plurality of connector terminals 106 and a second plurality of connector terminals 108. Connector terminals 106 coact with a pin-type plug 110 at the end of a cable 112. Cable 112 includes a plug 114 at its remote end for plugging receipt of plug 90 so that plug 110 embodies the information from leads 86 and 88. Connector terminals 108 coact with a pin-type plug 118. Plug 118 embodies the information from leads 120, 123, 124 and 125. Lead 120 is associated with a switch 130 sensing the open or closed position of the driver's door 131 of the vehicle; lead 121 is associated with a switch 132 sensing the presence or absence of a driver in the driver's seat of the vehicle; leads 123 and 124 are connected to the negative and positive terminals of the vehicle battery 135 with a suitable fuse 136 in lead 123; and lead 125 is connected to a speed sensor 137 which provides information with respect to the instantaneous speed at which the vehicle is traveling.

Enabling submodule, or key card 36c, has a size and configuration corresponding to a typical credit card and includes a plurality of push button membrane-type switches 133, a magnetic code strip 134, and electrical contact means 135.

Push button membrane switches 133 correspond respectively to the various shift positions of the transmission, are normally closed, and are electrically connected by leads 136 embedded in card 36c to the respective contact means 135 along the leading edge of the card.

Magnetic strip 134 provides information corresponding to a unique vehicle identification code so that the magnetic information provided in each key card 36c is different for each control unit 36 and therefore different for each vehicle.

The invention shift assembly is delivered to the vehicle manufacture in the form of power module 34 and control module 36. During the assembly of the vehicle, the power module 34 is mounted on the transmission housing 32 in coupling relation to mode select shaft 30 and the control module 36 is mounted in the instrument panel 10 whereafter plug 90 is plugged into plug 114 and plugs 110 and 118 are plugged into control module 36 to complete the assembly of the invention electric shift apparatus.

The mounting of power module 34 on the transmission housing is accomplished simply by positioning the lower end 52a of reduction shaft 52 over the upper end 30a of mode select shaft 30 and passing bolts 54 downwardly through bores 46d and spaces 56 for threaded engagement with tapped bores 32a in transmission housing 32.

The installation of control module 36 and instrument panel 10 is effected simply by moving the control module from the rear of the panel into the opening 10a and fastening the module in place by the use of fasteners 96 or the like. Following the plugging of plug 90 into plug 114 and the plugging of plugs 110 and 118 into connector terminals 106 and 108, the system is operational and ready for use.

When the vehicle is delivered to a user, the user is given possession of key card 36c which, as previously indicated, has a size and shape conforming to a credit card so that the user may carry the card on his person when the vehicle is not in use. When the user desires to use the vehicle, key card 36c is inserted into a slot 10b in the instrument panel and through slot 103 in receptacle submodule 36a to position the respective contacts 135 on the leading edge of the card in electrical contact with respective pairs of contacts 102a provided on circuit board 102; to position push buttons 133 within window 99; and to position magnetic strip 134 beneath card reader 100. Insertion of the key card 36c into the receptacle submodule has the effect of enabling the starter motor system of the engine 16 and has the further effect of enabling the operation of the transmission 32.

Specifically, card reader 100 reads the unique vehicle identifying code indicia provided by magnetic strip 134 and transmits the read information via a lead 140 to a comparator 142 which compares the signal from the reader 100 to a stored code indicia corresponding to the unique identifying code of the vehicle and, provided that the code from reader 100 matches the stored code, transmits an enabling signal via a lead 144 to logic submodule 36b to enable the starting motor system of the vehicle and allow starting of the vehicle engine, thereby eliminating the necessity for a separate ignition switch in the vehicle control system.

Further, insertion of key card 36c into the receptacle submodule completes respective circuits through circuit board 102, contacts 135, leads 136, and push buttons 133 to condition the transmission for operation. Thereafter, depression of any specific push button 133 has the effect of opening the switch controlled by that button so as to signal the logic module to operate the power module in a sense to move the transmission to the position corresponding to the depressed button. Further, the indicator light 101 corresponding to the instantaneous position of the transmission is always lit so as to always apprise the operator of the actual position of the transmission. When the key card 36c is removed and certain logic criteria such as speed sensing have been met, the controller detects all seven circuits opening, initiates a cycle to the Park position of the transmission, and shuts down or locks out the shifting. The indicator light corresponding to the position of the transmission remains lit even after removal of the card so that, in a typical situation following a normal duty cycle of the vehicle, the card is removed, the transmission shifts to Park, and the Park light remains lit to provide an ongoing indication of the position in which the transmission has been left. The Park indicator light may remain on indefinitely or, preferably, a timer may be provided to extinguish the light after a predetermined period of time following the removal of the key card. When the key card is again inserted into the receptacle submodule, the indicator light corresponding to the instantaneous position of the transmission is lit to apprise the operator of the present position of the transmission or, alternatively, means may be provided to light the indicator light corresponding to the present position of the transmission upon the initiation of operator entry into the vehicle such, for example, as occasioned by opening of the door of the vehicle.

In use, the various input signals provided by depression of the various push button switches 133 are supplied to logic chip 141, which may be a programmable logic array or a gate array. Logic chip 141 is configured to receive these input signals and generate the necessary drive signals to motor 38 via a buffer 142 for providing the selection of the desired gear. Firstly, the various input signals are formed into a set of logic signals. These logic signals include a set of signals whose state is selected by the depressed push button 133; PARK, RVRS, NTRL, OVDR, DRVE, LOW1 and LOW2. One of these signals corresponding to the desired gear selected by the depressed push button is a logic "1" while the other of these signals is a logic "0". Similarly, the encoder signal from encoder assembly 72 permits generation of a set of logic signals PGP, PGR, PGN, PGO, PGD, PGL1 and PGL2, one of which is active to indicate the present gear and the others of which are inactive. The speed sensor input signal is formed into four logic signals MPH 3 indicating a speed of greater than or equal to 3 miles per hour; MPH 7 indicating a speed of greater than or equal to 7 miles per hour; MPH 20 indicating a speed of greater than or equal to 20 miles per hour; and MPH 30 indicating a speed of greater than or equal to 30 miles per hour. Each of these signals is active if their condition is satisfied and inactive if not. Note that these signals ar cumulative. If the speed is over 30 miles per hour, then all will be active. Additional logic signals include DOOR indicating the open/closed status of the driver's door, SEAT indicating whether or not the driver's seat is occupied, and ACC indicating whether or not the accelerator switch 138 is closed.

Logic chip 141 serves to compare the inputs indicating the depressed push button with the inputs indicating the present gear. If they differ, then logic chip 141 generates an output signal to motor 38 to rotate the motor until the present gear matches the selected gear. This process includes an indication of which shifts are up shifts and which shifts are down shifts according to Boolean equations, as explained more fully in U.S. Pat. No. 4,841,793, assigned to the assignee of the present application.

Keycard 36c may also be utilized to provide keyless entry for the vehicle. Specifically, a card reader 150 may be provided in door 131 so that, when keycard 36c is inserted into the door through a suitable slot in the outer face of the door, card reader 150 reads the information on magnetic strip 134 and transmits the read information via a lead 152 to comparator 142 which compares the signal from the card reader 150 to the stored code indicia corresponding to the unique identifying code of the vehicle and, provided that the code from reader 150 matches the stored code, transmits an enabling signal via a lead 154 to a suitable mechanism in the door for unlocking the door.

The invention electric shift apparatus will be seen to provide many important advantages. Specifically, the use of a separate enabling submodule as a part of the control module allows the operator to readily preclude unauthorized operation of the vehicle transmission and/or unauthorized starting of the vehicle engine and/or unauthorized entry into the vehicle. The separate key card providing the enabling module may be readily stored on the person of the operator so as to provide an extremely effective deterrent against thief of the vehicle since, even if a would-be theft is successful in jumping the starter motor circuit, the thief would still be unable to move the vehicle since the transmission, absent the enabling key card submodule, cannot be moved out of PARK.

Whereas a preferred embodiment of the invention has been illustrated and described in detail, it will be apparent that various changes may be made in the disclosed embodiment without departing from the scope or spirit of the invention.

I claim:

1. An electric shift control system for a motor vehicle of the type including a transmission control means adapted to be positioned in the vehicle passenger compartment for inputting operator shift requests, and means operative in response to inputted operator requests to shift the transmission to a shift position corresponding to the inputted operator request, characterized in that said control system includes a portable enabling module which is sized to be carried on the person of the vehicle operator and which is readily movable by the vehicle operator between an enabling position in which it is mechanically and electrically connected in said system to enable shifting of the transmission in response to the inputted operator requests and a disenabling position in which it is mechanically and electrically disconnected from said system to preclude unauthorized shifting of the transmission.

2. An electric shift control system according to claim 1 wherein:
said enabling module includes a plurality of mode select means corresponding respectively to the various transmission shift positions.

3. An electric shift control system according to claim 2 wherein:
said enabling module is in the form of a key card and said mode select means comprise a plurality of mode select switches on said card.

4. An electric shift control system for a motor vehicle of the type including a transmission, control means adapted to be positioned in the vehicle passenger compartment for inputting operator shift requests, and means operative in response to inputted operator requests to shift the transmission to a shift position corresponding to the inputted operator request, characterized in that said control system includes an enabling module which is readily movable by the vehicle operator between an enabling position in which it is mechanically and electrically connected in said system to enable shifting of the transmission in response to the inputted operator requests and a disenabling position in which is mechanically and electrically disconnected from said system to preclude unauthorized shifting of the transmission, said enabling module including a plurality of mode select means corresponding respectively to the various transmission shift positions and further including code indicia corresponding to a unique identifying code for the vehicle, said control system including means for recognizing said code indicia and operative in response to such recognition to enable starting of the vehicle engine.

5. An electric shift control system for a motor vehicle of the type including a transmission, control means adapted to be positioned in the vehicle passenger compartment for inputting operator shift requests, and means operative in response to inputted operator requests to shift the transmission to a shift position corresponding to the inputted operator request, characterized in that said control system includes an enabling module which is readily movable by the vehicle operator between an enabling position in which it is mechanically and electrically connected in said system to enable shifting of the transmission in response to the inputted operator requests and a disenabling position in which is mechanically and electrically disconnected from said system to preclude unauthorized shifting of the transmission, said enabling module including a plurality of mode select means corresponding respectively to the various transmission shift positions and further including code indicia corresponding to a unique identifying code for the vehicle, said vehicle including means for recognizing said code indicia and means operative in response to such recognition to enable entry into the vehicle.

6. Control means for the transmission of a motor vehicle operative in response to operator input to shift the transmission between its various shift positions, characterized in that the control means includes a receptacle fixedly positioned within the vehicle passenger compartment and a portable enabling module which is operative to enable the transmission control means when received in said receptacle means and operative to disenable the transmission control means when removed from the receptacle means.

7. A control means according to claim 6 wherein:
said enabling module includes mode select indicia corresponding respectively to the various transmission shift positions; and
with said module received in said receptacle means, said control means is operative in response to operator selection of a particular mode select indicia to shift the transmission to the transmission position corresponding to the selected indicia.

8. A control means according to claim 7 wherein:
said enabling module further includes code indicia corresponding to a unique identifying code for the vehicle and said control means further include means for recognizing said code indicia and operative in response to such recognition to enable starting of the vehicle engine.

9. A control means according to claim 8 wherein:
said enabling module comprises a key card and said mode select indicia comprise switches provided on said key card.

10. An electric shift apparatus for use with a motor vehicle having an automatic transmission of the type including a mode select member to selectively shift the transmission between a plurality of shift positions, said apparatus comprising a power module adapted to be connected to the mode select member of the transmission and a control module, including a plurality of mode select indicia accessible to the vehicle operator and corresponding respectively to the transmission shift positions, operative in response to operator selection of a particular indicia to energize the power module in a sense to move the mode select member to a position corresponding to the operator selection, characterized in that said control module includes a portable enabling submodule which is sized to be carried on the person of the vehicle operator, which embodies said mode select indicia, and which may be readily removed by the operator from the remainder of the control module to disenable the electric shift apparatus.

11. An electric shift apparatus according to claim 10 wherein:

said enabling submodule further embodies code indicia corresponding to a unique code for the vehicle and said apparatus further includes means for recognizing said code indicia and operative in response to such recognition to enable starting of the vehicle engine.

12. A control system for a motor vehicle of the type including a transmission having a plurality of shift positions characterized in that the control system includes a receptacle in the passenger compartment of the vehicle, a portable module sized to be carried on the person of the vehicle operator and to fit in the receptacle, and means operative in response to insertion of the module into the receptacle to allow shifting of the transmission and operative in response to removal of the module from the receptacle to preclude shifting of the transmission.

13. A control system according to claim 12, wherein the transmission shift positions include a Park position and a forward position and the control system is operative in response to insertion of the module into the receptacle to allow shifting of the transmission out of the Park position and is operative in response to removal of the module from the receptacle to preclude shifting of the transmission out of the Park position.

14. A control system according to claim 13, wherein the module is in the form of a key card.

15. A control system according to claim 14, wherein the card includes a plurality of indicia corresponding respectively to the transmission shift positions.

16. A control system for a motor vehicle of the type including a transmission and an engine characterized in that the control system includes a receptacle fixedly positioned within the vehicle passenger compartment and a portable enabling module which includes indicia corresponding to the respective shift positions of the transmission and code indicia corresponding to a unique identifying code for the vehicle and which is operative in response to insertion of the enabling module into the receptacle to allow shifting of the transmission and starting of the vehicle engine and which is operative in response to removal of the enabling module from the receptacle to disenable the engine starter system and the transmission.

* * * * *